United States Patent
Krill et al.

(10) Patent No.: US 8,130,260 B2
(45) Date of Patent: Mar. 6, 2012

(54) SYSTEM AND METHOD FOR 3-DIMENSIONAL DISPLAY OF IMAGE DATA

(75) Inventors: Jerry A. Krill, Fulton, MD (US); Nicholas D. Beser, Owings Mills, MD (US); David W. Blodgett, Ellicott City, MD (US); Michael W. Roth, Columbia, MD (US)

(73) Assignee: Johns Hopkins University, Baltimore, MD (US)

( * ) Notice: Subject to any disclaimer, the term of this patent is extended or adjusted under 35 U.S.C. 154(b) by 720 days.

(21) Appl. No.: 11/463,415

(22) Filed: Aug. 26, 2008

(65) Prior Publication Data

US 2009/0256904 A1  Oct. 15, 2009

Related U.S. Application Data

(60) Provisional application No. 60/735,132, filed on Nov. 9, 2005.

(51) Int. Cl.
*H04N 7/18* (2006.01)

(52) U.S. Cl. ................ 348/53; 348/51; 348/47
(58) Field of Classification Search ............ 348/42–60
See application file for complete search history.

(56) References Cited

U.S. PATENT DOCUMENTS

| | | | |
|---|---|---|---|
| 5,579,455 A * | 11/1996 | Greene et al. ............ | 345/422 |
| 5,703,637 A | 12/1997 | Miyazaki et al. | |
| 6,215,498 B1 | 4/2001 | Filo et al. | |
| 6,307,589 B1 | 10/2001 | Maquire, Jr. | |
| 6,449,103 B1 | 9/2002 | Charles | |
| 6,529,331 B2 * | 3/2003 | Massof et al. ............ | 359/630 |
| 2003/0107643 A1 | 6/2003 | Yoon | |

FOREIGN PATENT DOCUMENTS

WO PCT/US2009/052682  4/2009

OTHER PUBLICATIONS

Wolfgang Drexler et al., Eye Elongation during Accommodation in Humans: Differences between Emmetropes and Myopes, IOVS, Oct. 1998, pp. 2140-2147, vol. 39, No. 11.
Book Chapter Excerpts—pp. 29-62, source unknown, published Dec. 1999.

* cited by examiner

*Primary Examiner* — Andy Rao
(74) *Attorney, Agent, or Firm* — Albert J. Fasulo, II

(57) ABSTRACT

Disclosed is a system for a 3-dimensional display that includes at least one eyepiece having first and second eyepiece sockets, having a first display contained in said first eyepiece socket associated with a first eye, two eye cameras mounted such that a first eye camera tracks eye reference points of said first eye and a second eye camera tracks reference points of a second eye, a processor for providing overall control of said at least one eyepiece; a second display; and a main processor; signals are transmitted between said main processor and said at least one eyepiece, wherein said two eye cameras track said reference points, said eyepiece transceiver transmits said reference points to said main processor via said main transceiver, said main processor generates image data based on said reference points and transmits said image data to said displays to produce a 3-dimensional image.

21 Claims, 15 Drawing Sheets

SYSTEM AND METHOD FOR 3-DIMENSIONAL DISPLAY OF IMAGE DATA

CROSS-REFERENCE TO RELATED APPLICATIONS

This application claims the benefit of prior filed, co-pending U.S. Application No. 60/735,132 filed Nov. 9, 2005, the contents of which are incorporated herein by reference. The contents of related U.S. Application No. 60/683,758 filed May 23, 2005 are also incorporated herein by reference.

BACKGROUND OF THE INVENTION

1. Field of the Invention

The present invention relates generally to a system and method for a 3-dimensional display, and more particularly to a system and method for a 3-dimensional display of images that reduces processing requirements and reduces eyestrain.

2. Description of the Related Art

Much activity is underway to develop new forms of visualization including holography, 2½ dimensional (2½D) and 3 dimensional (3D) displays, and virtual reality, with the apparent objective to provide greater information coupling to the human senses. The present technologies are stereographic goggle systems similar to the old stereographic viewers for virtual reality, new forms of plasma flat screen displays with alternating stereo views using either sequential or interleaved simultaneous views, and a mechanical rapid movement optical system that provides a volumetric image within a glass dome. Present 3D display technology is either a) monochromatic (holography or colored glasses), b) flat digital displays with sequential or interleaved offsets for depth perception, essentially 3D perspective on 2D, virtual reality headgear (similar to stereographic goggle systems), and mechanical optics.

Another conventional system generally consists of a head mounted graphic display connected to a computer, along with a method for communicating to the computer the exact direction in which the person wearing the head mounted display is facing. The attempt of these systems is to create for the person wearing the display, the illusion of being in a different location. In order to achieve this, the computer displays the virtual environment as if it were being viewed from both the position and the direction that the person is looking. As the person moves his head and the head mounted display, the computer continuously changes the image being viewed to show the virtual environment from the current perspective. Thus, it appears to the person wearing the display that they are actually in the virtual environment and are looking around.

Another problem in the conventional systems arises when a computer computes the stereo offset of the scene to assure the user's 3D virtual display appropriately rotates and changes distance while the user moves and looks in different directions. This requires a precise input on the location and look angle, both head and eyes, of the user relative to the display to assure precise superposition of the actual and stereo offset images. This superposition, or grid alignment, is a problem that the conventional systems are attempting to solve.

SUMMARY OF THE INVENTION

It is, therefore, an aspect of the present invention to provide a method and apparatus for solving the longstanding problems of misalignment, eyestrain, and high costs associated with the conventional 3D systems by providing grid alignment among multiple participants.

It is, therefore, another aspect of the present invention to provide a method and apparatus for reducing eyestrain with present 3D glasses It is yet another aspect of the present invention to provide a method and apparatus for reducing hardware costs in required computing power.

In accordance with an aspect of the present invention, there is provided a system for a 3-dimensional display, including at least one eyepiece having first and second eyepiece sockets, having a first display contained in said first eyepiece socket associated with a first eye for displaying first image data; two eye cameras mounted such that a first eye camera tracks eye reference points of said first eye and a second eye camera tracks eye reference points of a second eye; a processor for providing overall control of said at least one eyepiece; and an eyepiece transceiver for transmitting and receiving signals; a second display for displaying second image data; a main processor; and a main transceiver connected to said main processor for transmitting signals between said main processor and said at least one eyepiece, wherein said two eye cameras track said reference points of said first and second eyes, said eyepiece transceiver transmits said reference points to said main processor via said main transceiver, said main processor calculates a focal point based on said eye reference points and generates said first and second image data based on said focal point, said first and second image data transmitted to and output from said first and second displays, and wherein said first and second image data output from said first and second displays produces a 3-dimensional image.

In accordance with a further aspect of the present invention, there is provided a method for 3-dimensional displaying of image data, that includes tracking eye reference points of a first eye; tracking eye reference points of a second eye; calculating a focal point based on the eye reference points; generating 3-dimensional image data based on said focal point; and displaying said 3-dimensional image data on at least one display.

In accordance with a yet further aspect of the present invention, there is provided a system for a 3-dimensional display, including at least one eye camera to track eye reference points of a first eye and a second eye; a processor for calculating a focal point based on said eye reference points and generating 3-dimensional image data based on said focal point; and at least one display for displaying said 3-dimensional image data.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

Figure 1:
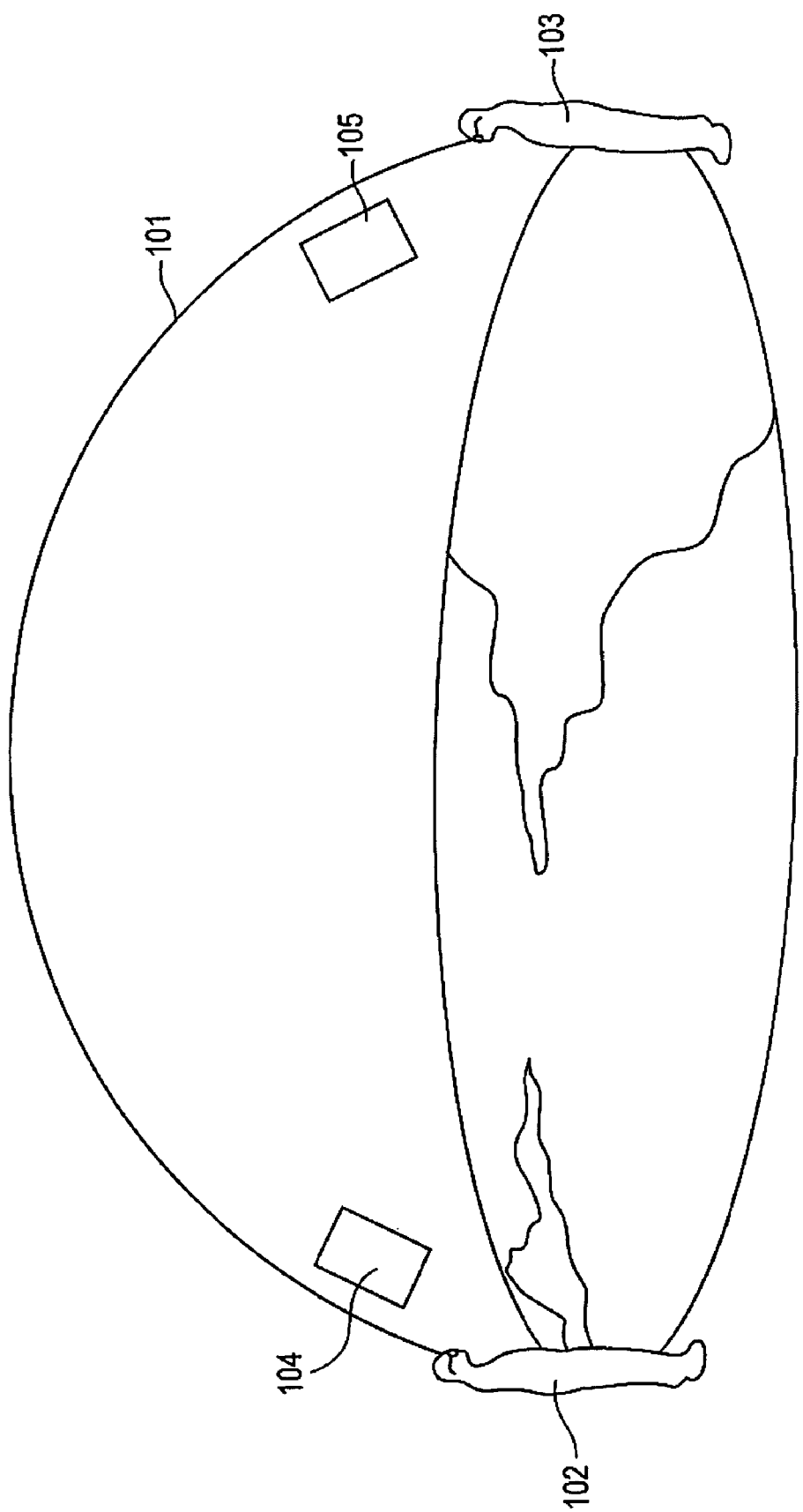
FIG. 1 is an illustration of a domed 3D system to which the present invention is applied.

A preferred embodiment of the present invention will be described in detail herein below with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention.

The present invention presents a 3D walkthrough display of potential value for such uses as military command and control, advanced video games, and "virtual visits". The present invention also solves the longstanding fatigue problem with long-term use of virtual reality eyewear, grid alignment, and rapid scene call-up and conditioning within standard computer performance bounds.

The present invention can be applied to systems wherein a scene is viewed by many participants from their different vantage points, yet individually addresses required information in a custom manner by each participant according to their role, and with the ability to "tour" or "walk through" the scene to gain a better perspective of the tactical or strategic situation, and have the ability to virtually travel to an object of the display for visual/audio conversation and presence. It is a special human trait to 'experience' a scene by immersion in it, and this is a means to create the maximum experience, and therefore sensory input, to a user.

Figure 2:
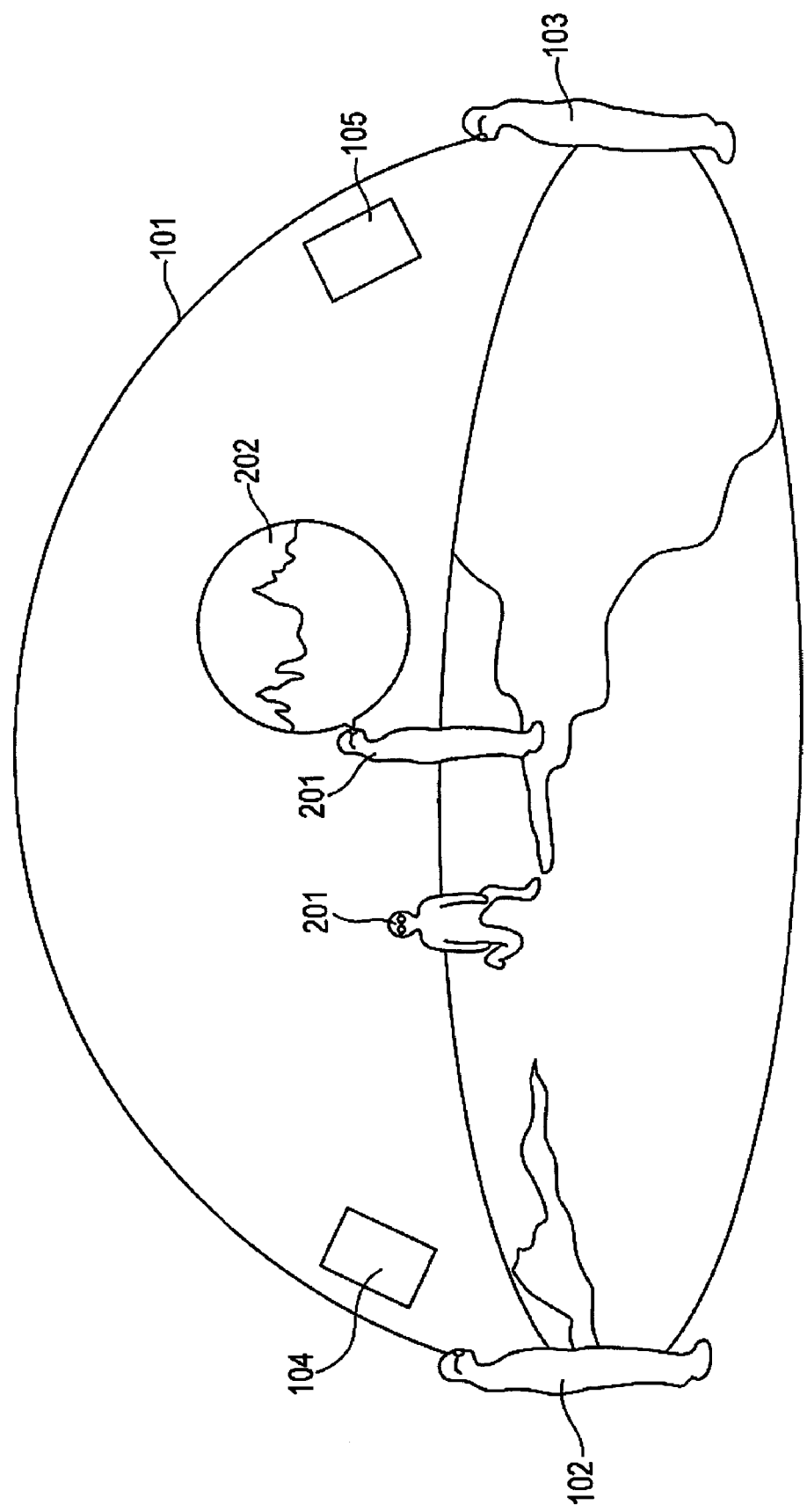
FIG. 2 is an illustration of the domed 3D system of FIG. 1 detailing an aspect of the display referred to as a "Virtual Stroll" or "Virtual Walkthrough"
Figure 3:
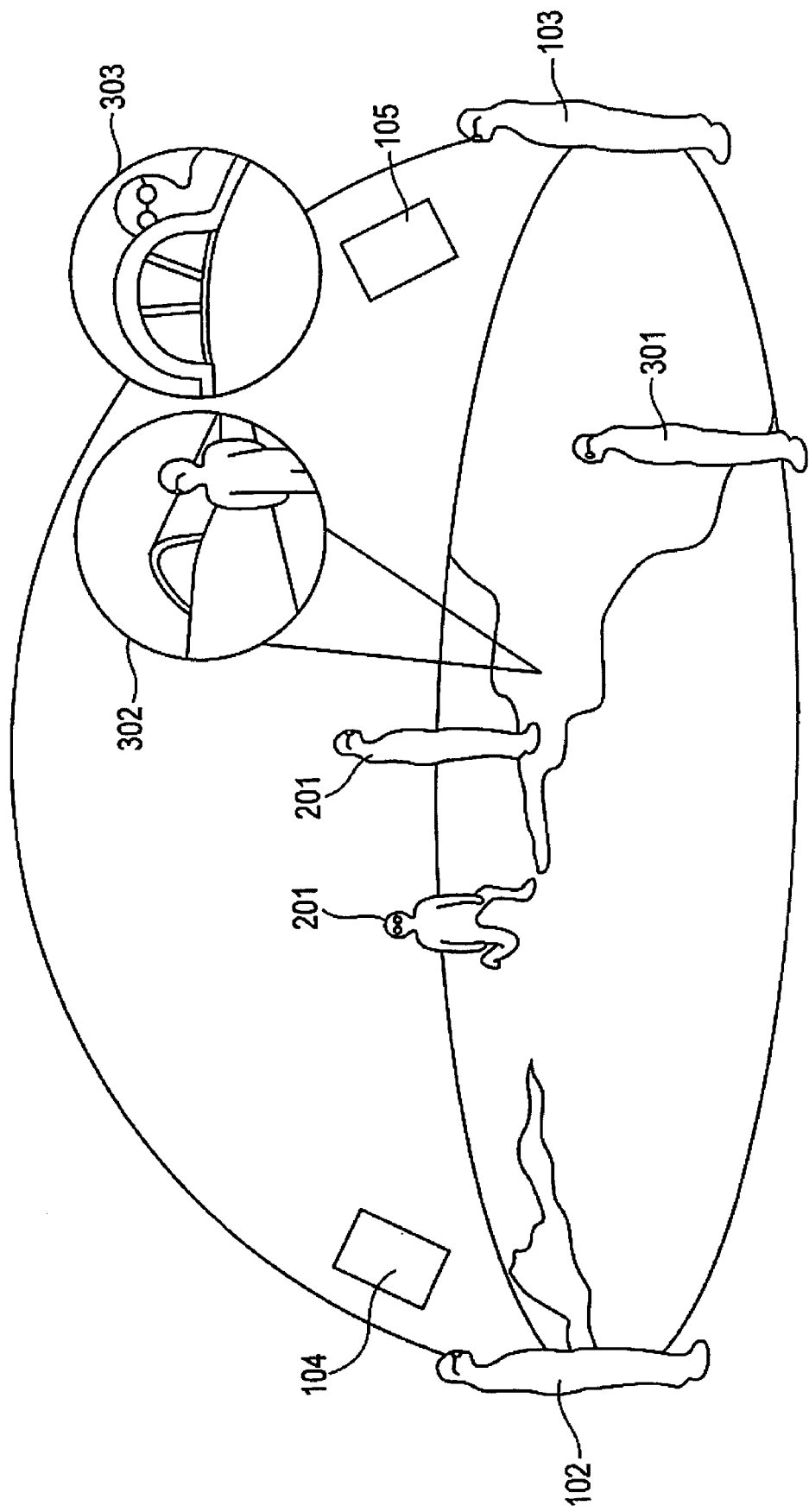
FIG. 3 is an illustration of the domed 3D system of FIG. 1 detailing an aspect of the display known as a "Virtual Visitation"

FIGS. 1-3 illustrate a 3D system to which the present invention is applied.

FIG. 1 is an illustration of a domed 3D system to which the present invention is applied. In the domed 3D system 101, multiple users 102 and 103 view a common, comprehensive display of a theater operation, each with a unique 3D perspective from their vantage angle. Each user 102 and 103 can move around the periphery to see the best aspect for their area of interest. Additionally, each user can be provided with unique information available for retrieval subject to their particular roles. A small virtual alphanumeric screen 104 and 105 that can be custom developed containing key detailed information for each user 102 and 103 (e.g., object identification, player status, etc.) is also available. Unique identifiers on objects of the 3D display can be made viewable to any number of users (or others with that user's permission). The unique identifiers could, for example, include special color labels of the objects.

FIG. 2 is an illustration of the domed 3D system of FIG. 1 detailing an aspect of the display referred to as a "Virtual Stroll" or "Virtual Walkthrough". As the users 201 walk among the 3D objects they can gain perspectives such as, the magnitude of speeds or distances, the urgency of threats or an emerging understanding of threat tactics or strategy (e.g., for video games or military command and control). Others can see the users on their 'strolls' through the scene 202, and this helps a group understanding of what the individual areas of focus are.

FIG. 3 is an illustration of the domed 3D system of FIG. 1 detailing an aspect of the display known as a "Virtual Visitation". In this case, based on ongoing information flow, e.g., between a ship or aircraft and the command center in a military application, or with another player in a multi-player gaming application, the user 301 can virtually visit alongside 302 or within 303 the vehicle and hold a person to person conversation complete with relevant cockpit imagery and computer data summaries or game play environments. This allows a user to gain the 'feel' of the combat situation or game environment, act and appear appropriately, even from thousands of miles away. Of course, this requires use of a communication system with adequate information bandwidth.

As identified in FIGS. 1-3, these aspects can be accomplished either via personal goggles and earphones or, in the domed system of FIGS. 1-3, from the display dome itself (display and speakers), depending on the technologies selected in the design. Each user can be uniquely involved using one or more of the identified features and yet remain aware of the activities of other users, all operating on the same comprehensive information displayed in a common manner for consistent perceptions.

Figure 4:
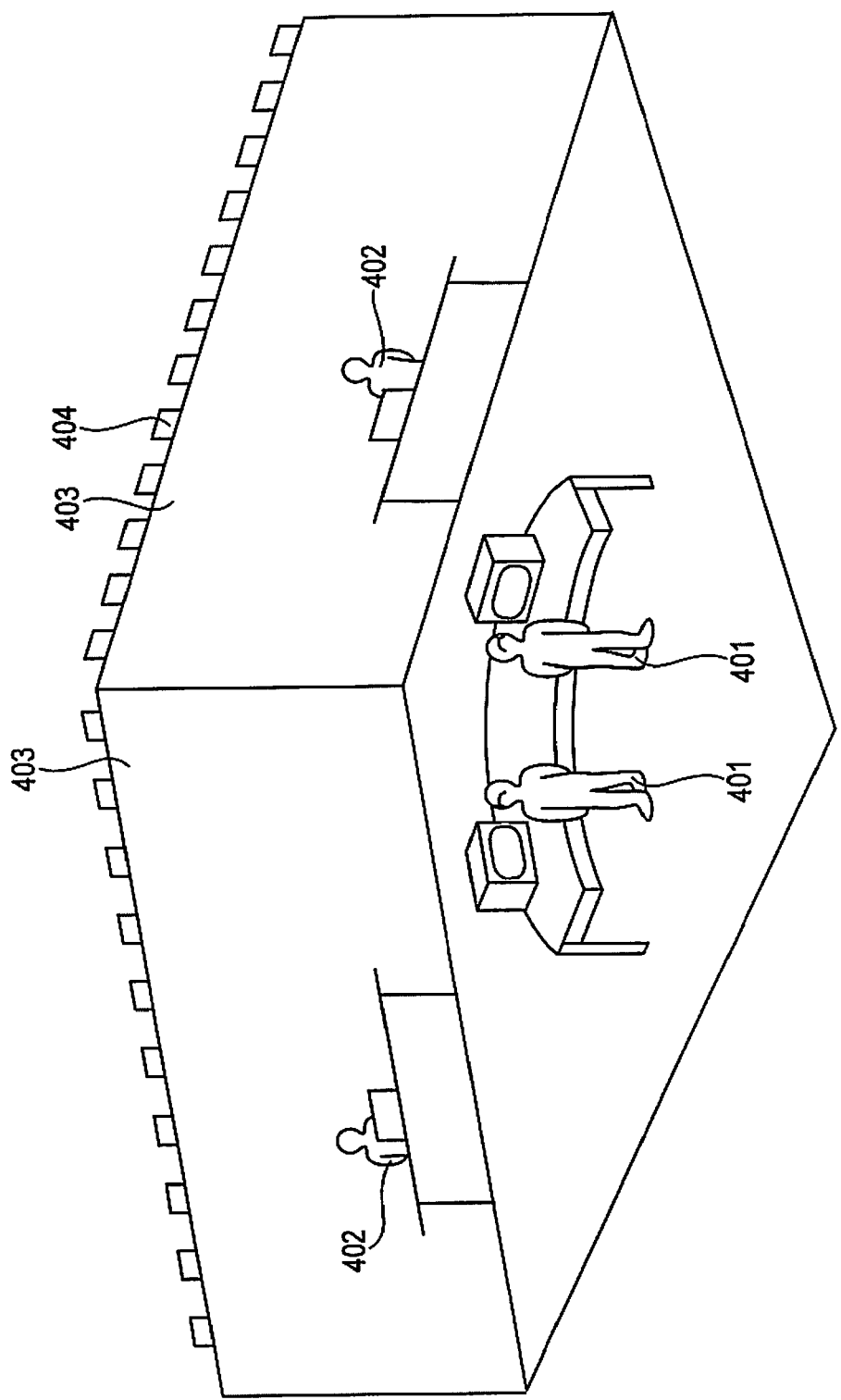
FIG. 4 illustrates a virtual 2D conference room.
Figure 5:
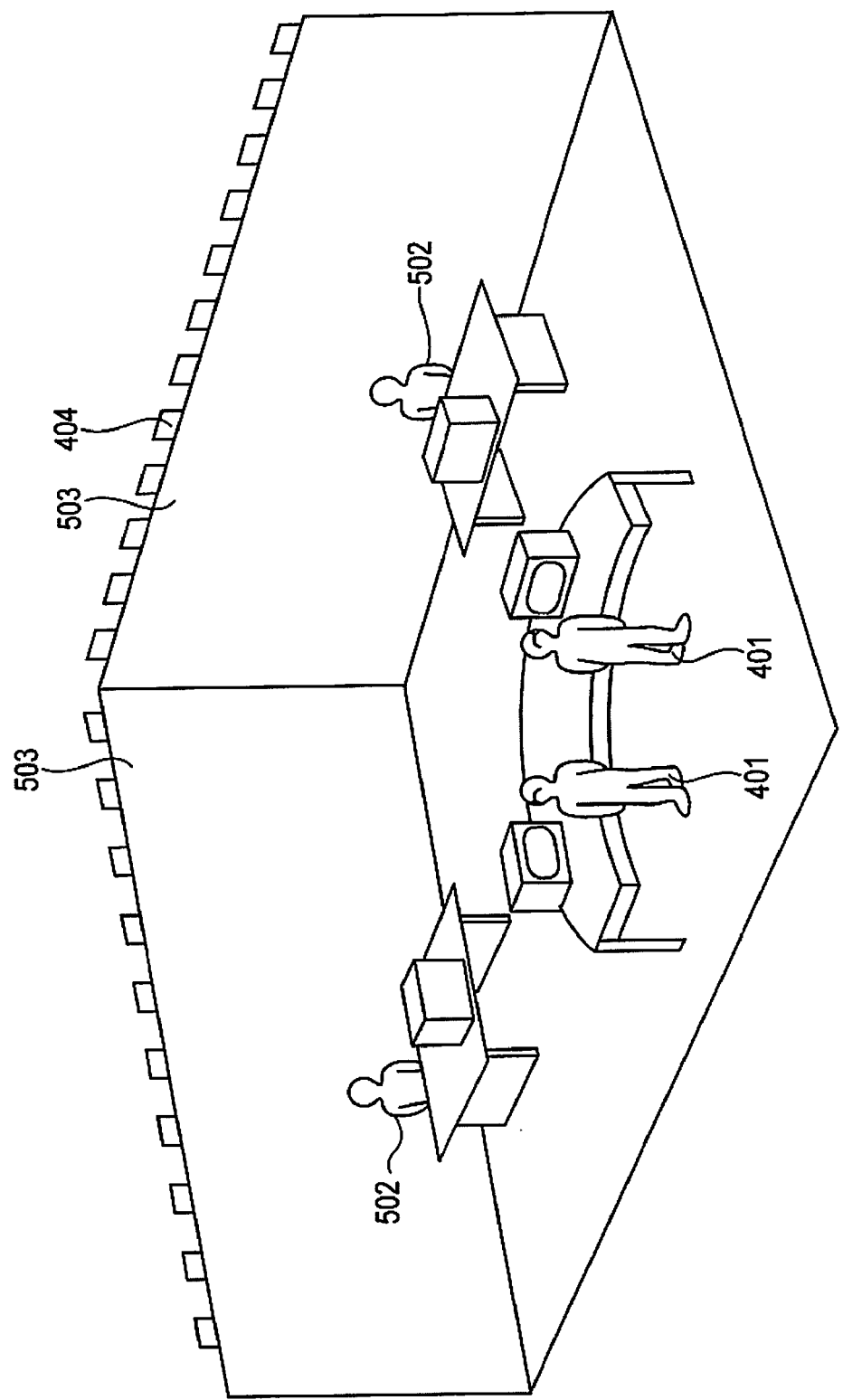
FIG. 5 illustrates a virtual 3D conference room to which the present invention is applied.

FIG. 4 illustrates a virtual 2D conference room, and FIG. 5 illustrates a virtual 3D conference room to which the present invention is applied. When the present invention is applied to the system of flat screen display walls 403 shown in FIG. 4, the conference room of FIG. 4 transforms into the 3D conference room appearance of FIG. 5. The 3D display is of sufficient detail to each user to read body language as well as share detailed data and collaboratively construct planning. This provides a 3D approach with the ability of local 401 and remote 402/502 users to appear in, and participate with, each other in a 3D display backdrop 503.

To support the use of goggles/earphones and/or backdrop 2½D imagery, multiple cameras and microphones 404 are arrayed on the walls to gain inputs from different vantages as data for computing 3D perspective for each participant from their location in the room. High communications bandwidth (e.g., megabits per second to gigabits per second depending on application) are required depending on the amount of detailed information to be displayed between sites including 3D imagery. Present fiber-based telecommunications infrastructures and wi-fi communications are compatible with this bandwidth need.

The Virtual Conference Room illustrated in FIG. 5 is not only useful for military command and control but could enhance and facilitate commercial corporate meetings with sufficient fidelity to negate the need to travel to a common site. A personal consumer version of such a capability is also possible as illustrated in FIGS. 6 and 7.

Figure 6:
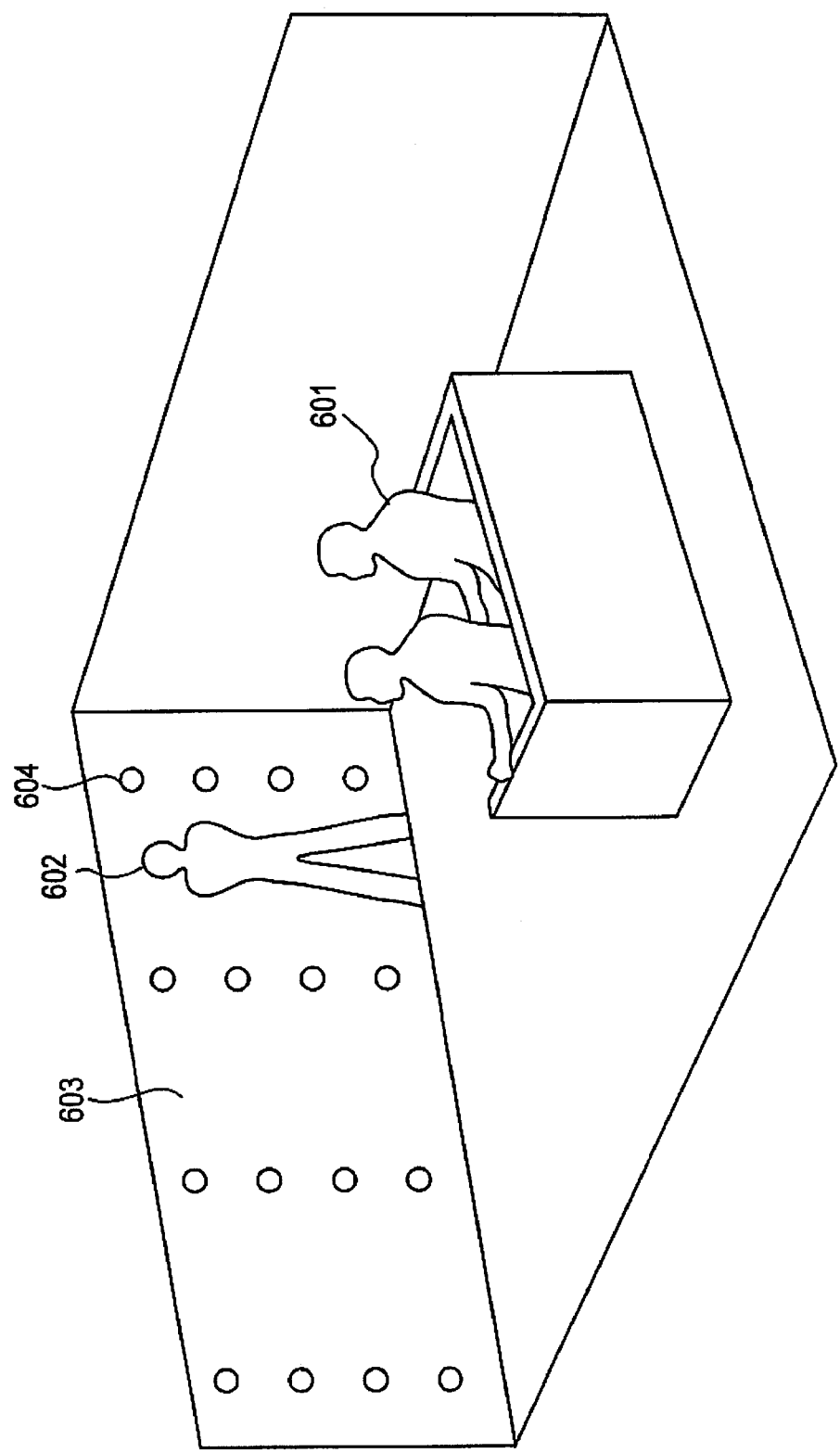
FIG. 6 illustrates a virtual 2D visitation room.
Figure 7:
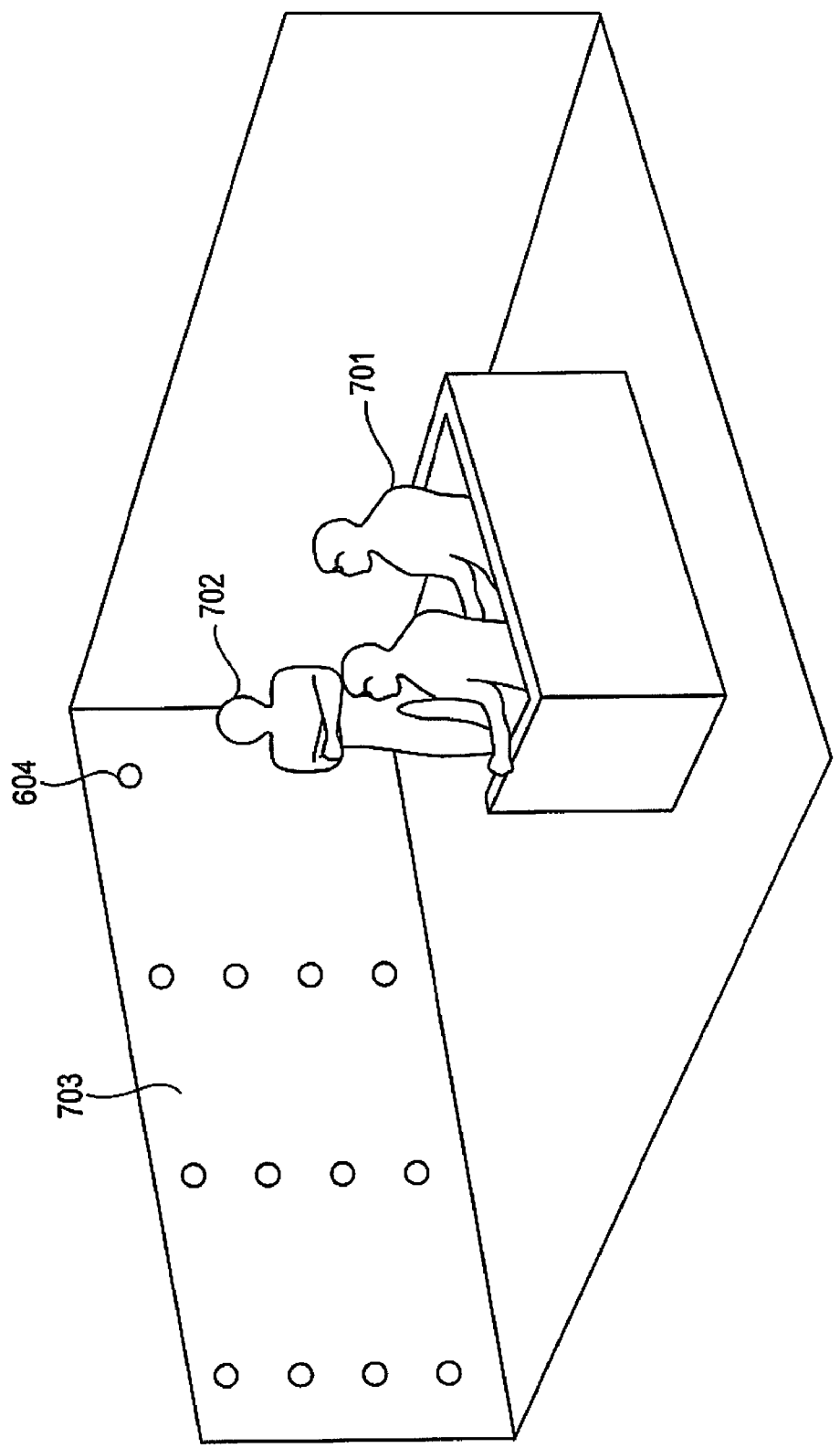
FIG. 7 illustrates a virtual 3D visitation room to which the present invention is applied.

FIG. 6 illustrates a virtual 2D visitation room, and FIG. 7 illustrates a virtual 3D visitation room to which the present invention is applied. When the present invention is applied to the system of flat screen display walls 603 shown in FIG. 6, the visitation room of FIG. 6 transforms into the appearance of a 3D visitation room 703 of FIG. 7. In this 'virtual visitation room' the partial rooms of remote homes are merged with the local room and 3D images of local 601/701 and remote 602/702 people can be seen sitting together in conversation even though they may be many miles away. Again, an array of cameras and microphones 604 are provided.

In the above embodiments, wherever the user walks, a computer computes the stereo offset of the scene to assure the user's 3D virtual display appropriately rotates and changes distance at all times. As discussed earlier, this requires precise input on the location and look angle (head and eyes) of the user relative to the display to assure precise superposition of the actual and stereo offset images.

A detailed description of the present invention will now be described with reference to FIGS. 8-10. It is noted here that the following detailed description will describe, at least in part, the above aspects of the present invention of mutual participation with precise alignment to the pupil level of precision, reduction of eye fatigue, real time interaction, and image 3D resolution to the limits of the eye.

Figure 8A:
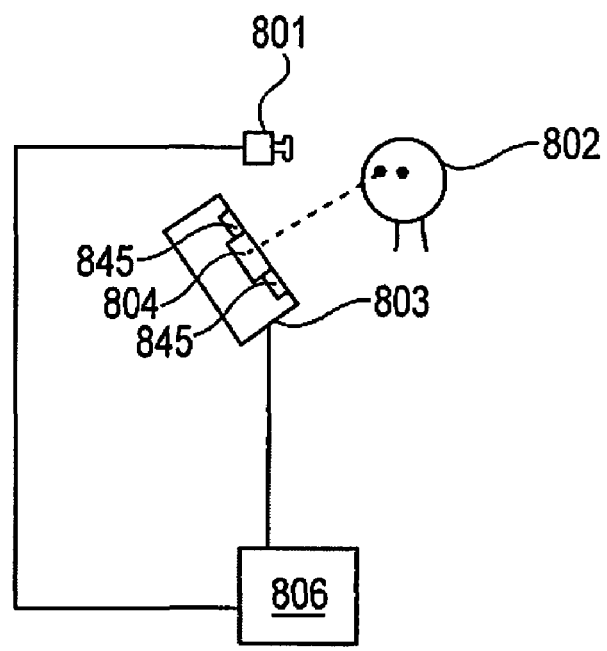
FIG. 8 illustrates an embodiment of the present invention wherein no goggles are used.
Figure 8B:
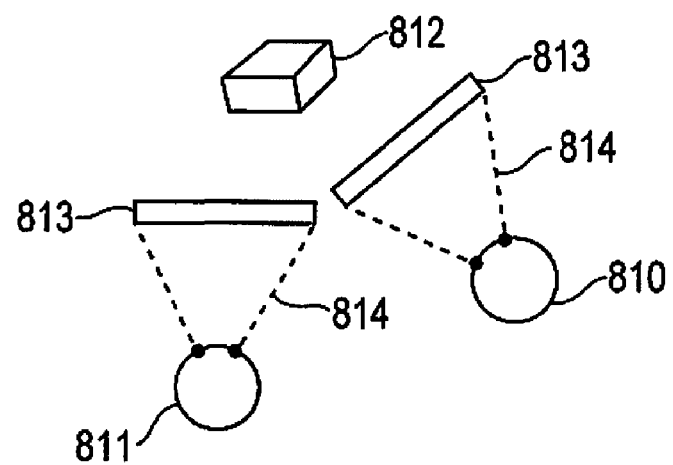

FIG. 8 illustrates an embodiment of the present invention wherein no goggles are used. Diagram (a) of FIG. 8 illustrates a user 802 with a television camera 801 trained on his head to allow tracking of several key features, for example, the head direction, certain key reference points around the eye sockets to indicate the reference frame for the pupils, and the pupils themselves. These features are located and tracked 806 in the digitized scene in a manner to be described later. This configuration also features a display 803 that is specially configured to display 3D stereo that is currently available in the present art. The user's pupils and their focus are tracked, and the system responds with detail imagery in the eyes' focus area 804 and with less detail in the peripheral zone 805 outside the eyes' focus area 804. This allows the optimum 3D perspective and focus for the user. It also opens the possibility of the user's eyes giving commands depending on what part of the video scene or menu in the scene the eyes focus on.

Diagram (b) of FIG. 8 is an embodiment wherein two or more users 810 and 811 are viewing the same scene 812 from different perspectives based on the computation of their different eye viewing angles and screen 813 orientations. Although this does not provide walkthrough of the scene, it provides for mutual participation from different aspects 814, and remote users could be embedded in the scene such as for a videogame or teleconferencing using the imagery from the cameras trained on them.

Figure 9:
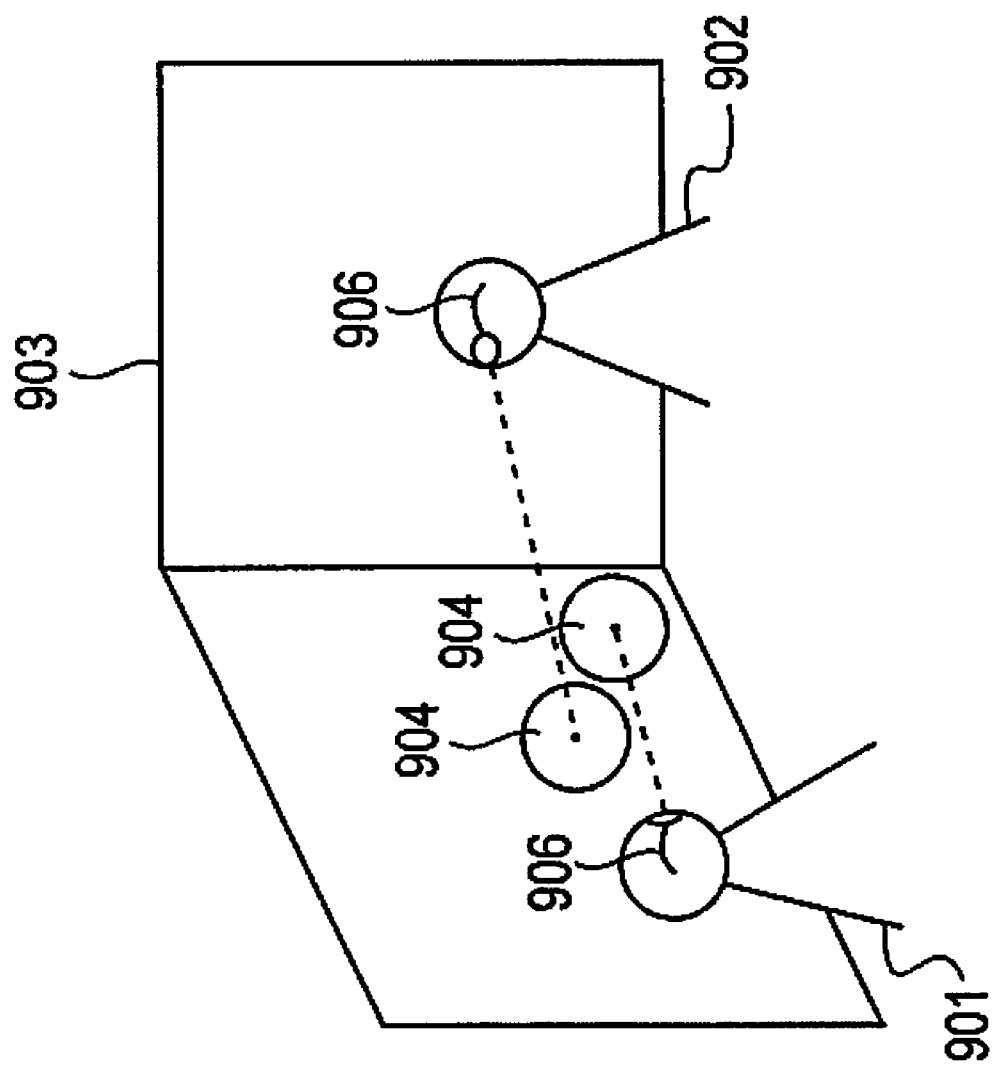
FIG. 9 is a diagram illustrating an embodiment wherein two users are wearing goggles.

FIG. 9 is a diagram illustrating an embodiment wherein two users 901 and 902 are wearing goggles. Each set of goggles or eyewear has only one lens. A tiny liquid crystal display (LCD) is supplied in one socket. The other eye views the background surround (2½D projected) scene display 903 through a clear lens (possibly with refraction correction for an individual user) supplied in the other eyewear socket. Both eye pieces (LCD or clear lens) feature an eye tracker so the LCD eye piece can be precisely aligned to the screen. The detailed pupil focus area and eye fatigue-sensing, lower-resolution, annular imaging around the focus area is applied only to the LCD screen. The eye looking through the clear lens naturally produces this effect from the background display scene. A tiny video projection on plane glass can be used in place of the LCD to present the stereo offset to the common picture, computed based on the user's location. In this manner the combination of scenes, one clear lens for the common display and the other stereo offset, provide a full color, full resolution 3D image of the scene to that user. The offset display picture tailored to the user's vantage point 904 and can be transmitted to the eyeglasses via a high bandwidth fiber or wireless transceiver 906.

Figure 10A:
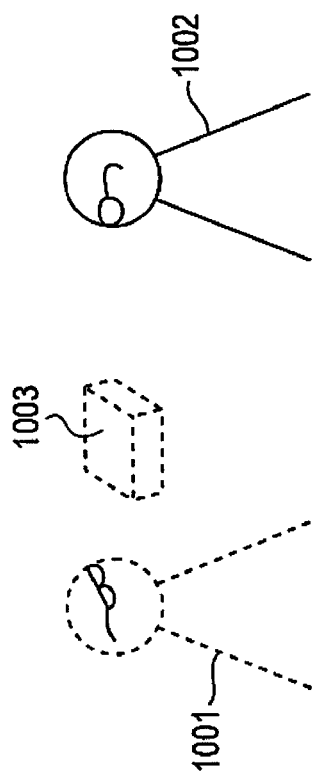
FIG. 10 illustrates a similar approach as shown in FIG. 9, but with the common wall, floor, or bubble display scene replaced with the second eyepiece in each user's eyewear set.
Figure 10B:
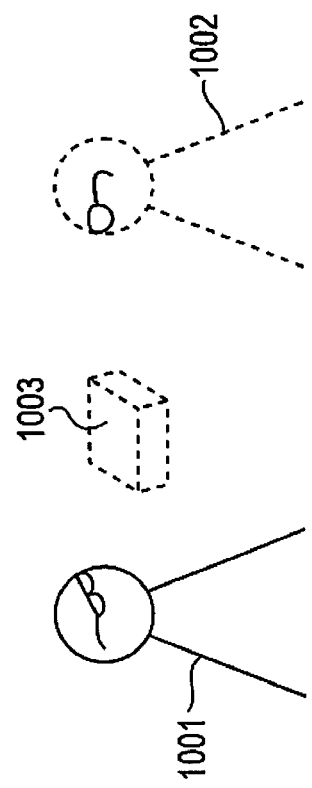

FIG. 10 illustrates a similar approach as shown in FIG. 9, but with the common wall, floor, or bubble display scene replaced with the second eyepiece in each user's eyewear set. Now the users 1001 and 1002 can be either local or remote, but they can only appear together when arrays of television cameras record their position, produce 3D images of the users, and embed them in the common 3D scene 1003 in their respective eyewear views.

All three configurations allow users from remote sites to be part of the scene, but only in FIG. 10 are the local users virtually embedded in the scenes rather than actually being seen nearby.

Figure 11:
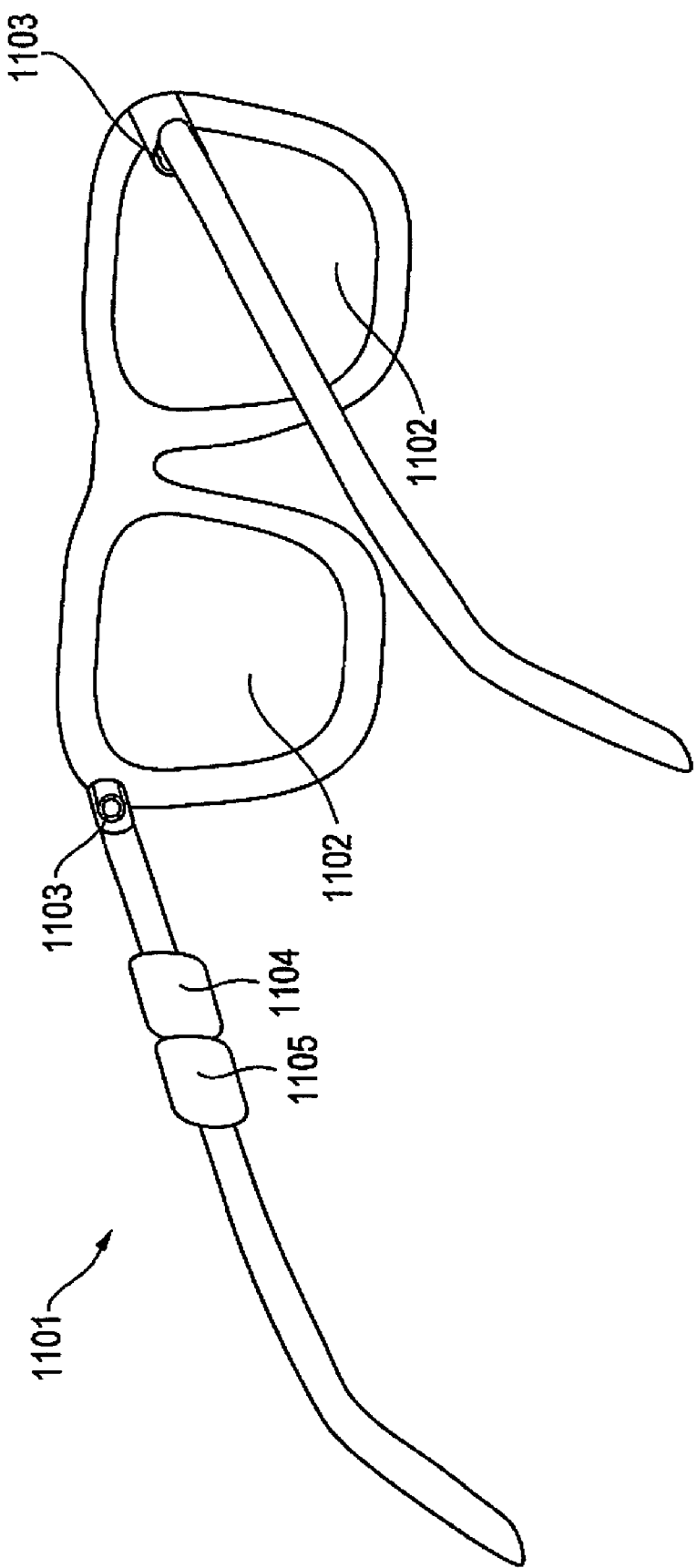
FIG. 11 illustrates the baseline design features for the eyeglasses according to the present invention.

FIG. 11 illustrates the baseline design features for the eyeglasses according to the present invention. This eyepiece set, used in the embodiments of FIGS. 9 and 10, provides for reducing eye fatigue, scene alignment, optimizing the image for maximum resolution at minimum computational performance. This novel eyepiece also provides for the discerning of eye commands for feedback to the image generation subsystem e.g., to a real time camera, pre-recorded database, or computer generated scene. The functions identified are also applicable to the embodiment shown in FIG. 8 where eyewear is not used. In the case of the embodiment shown in FIG. 8, one LCD eyepiece identified in FIG. 11 would be replaced with a display screen. All functions shown are implemented as software in one or more computers. Therefore, FIG. 11 applies to each eye for the embodiment depicted in FIG. 10, for one eyepiece and one screen view in embodiment shown in FIG. 9, and for a single 3D screen in the embodiment shown in FIG. 8.

The eyewear 1101 features eye tracker cameras 1103 so that the LCD display can be precisely aligned with the user's view of the display screen. Only one camera per eye mounted either to see each eye as shown or mounted near each ear and picking up reflections from the LCD(s) and glass lenses. This acts as a grid coordinate and angle alignment mechanism that is more advanced than that available in the prior art. Whether the scene display is presented as a wall mount, a floor display, or even a surrounding bubble, multiple users can co-view the common scene from each user's vantage point because their individual LCD displays provide the unique 3D stereo offsets precisely aligned to the individual eye pupils to the screen. The detailed focal area and peripheral annulus mentioned above are provided to the LCD display corresponding to the pupil look angle as a fatigue-saving, view-integrating feature that allows a natural user merging of the LCD and screen views as a combined 3D image.

Regardless of the particular embodiment, a fiber optic camera 1103 is provided for each eye. Each fiber optic camera 1103 has a sufficient field of view so that it views the entire eye viewing area. In this way, for an eyepiece 1101, the camera system 1103 can be mounted from the ear (not shown) and can image the eye's reflection from the partially reflecting eyepiece surface. For the screen, with no eyewear, a camera 1103 is mounted near the screen looking back at the subject and viewing each eye directly to track movement. For the LCD display, eyewear the camera 1103 may be in the visual regime if it can discern the eye reflection against the scene being displayed on the LCD eyepiece display. The LCD display view may be directionally suppressed in the camera direction to increase eye reflection contrast. Otherwise an infrared camera can be utilized. Also, it is best if ambient light is sufficient to illuminate the eye so that adequate reflected light reaches the camera. The illumination can be from the LCD scene itself Another source of illumination can be light at a wavelength, e.g., infrared that does not interfere with the LCD scene. Each eyepiece 1101 is also supplied with an eyepiece processor 1104 for providing overall control of the eyepiece 1101, and an eyepiece transceiver 1105 for transmitting and receiving signals to and from a main computer (not shown).

Figure 12:
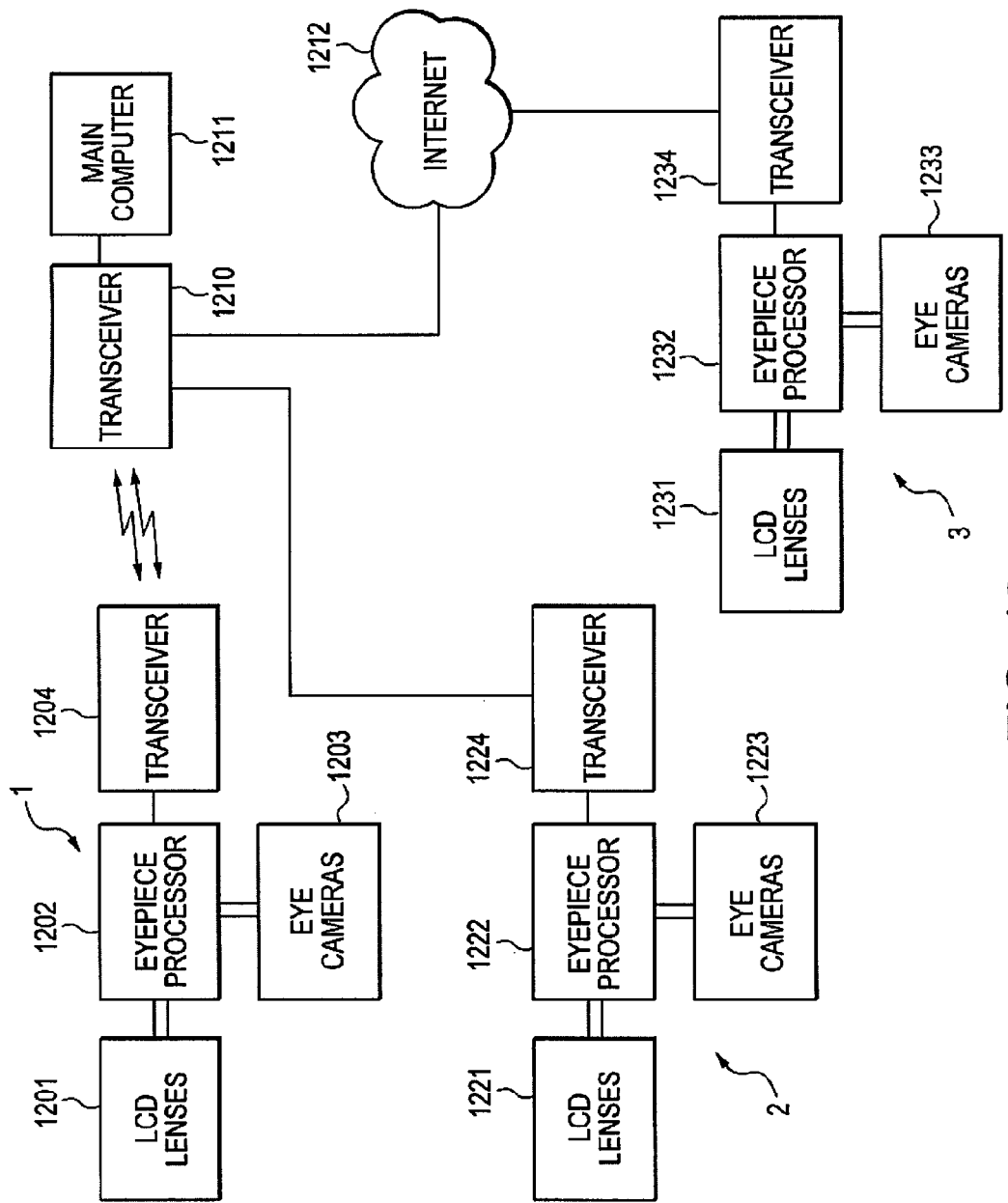
FIG. 12 is a diagram of the system for 3D display according to the present invention.

FIG. 12 is a diagram of the system for 3D display according to the present invention. The system described in FIG. 12 is that used in the embodiment described in FIG. 10, in that there are 2 LCD lenses. It will be understood by one skilled in the art how to modify the number of LCDs or use displays to conform the system to those embodiments described in FIGS. 8 and 9.

Three eyepieces are illustrated in FIG. 12, eyepiece 1 consists of elements 1201-1204, eyepiece 2 consists of elements 1221-1224, and eyepiece 3 consists of elements 1231-1234. Although 3 eyepieces are shown in FIG. 12, any number of eyepieces can be used from 1 on up and can correspond the number of users. Each eyepiece is comprised of two LCD lenses (1201, 1221 and 1231) and two eye cameras (1203, 1223 and 1233) each connected to an eyepiece processor (1202, 1222 and 1232), respectively. Each eyepiece also contains a transceiver (1204, 1224 and 1234) to process signals to and from a main computer 1211 through a transceiver 1210 associated with the main computer.

In FIG. 12, eyepiece 1 is shown in a wireless communication with the main computer 1211, eyepiece 2 is shown in a wired communication with the main computer 1211, and eyepiece 3 is shown connected to the main computer 1211 via the Internet 1212. Any of these connections are contemplated and one skilled in the art would understand the different communications protocols required for each type of connections, which is outside the detail of the present invention and will not be described in further detail.

Figure 13:
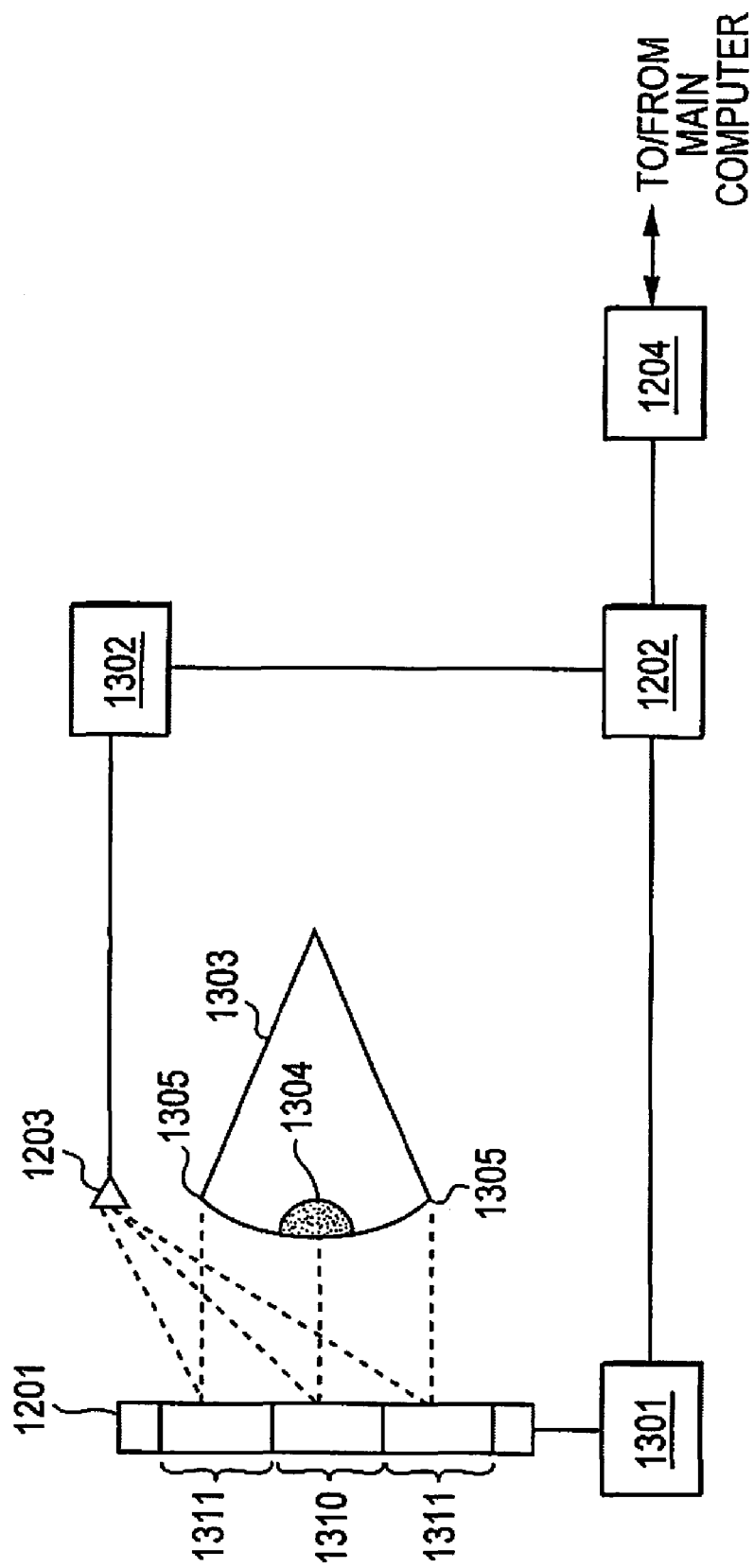
FIG. 13 is a detailed view of the interaction between an eyepiece and a user's eye according to the present invention.

FIG. 13 is a detailed view of the interaction between an eyepiece and a user's eye according to the present invention. Shown in FIG. 13 are LCD lens 1201 and eye camera 1203. It is understood that there are two LCD lenses and two eye cameras in the preferred embodiment, but only one of each is shown herein for simplicity of explanation. Also shown in FIG. 13 are camera driver module 1302 for controlling the eye camera 1203, eyepiece processor 1202, LCD drive control module 1301, transceiver 1204, eye 1303, and pupil 1304. Eye camera 1203 is shown tracking reference points around the eye sockets 1305 to indicate the reference frame for the pupil 1304, and the pupil 1304 itself. The eye socket reference points 1305 are tracked to fine tune the grid alignment.

As shown in FIG. 13, the eye tracking is performed via the reflection method described in detail above, that is, ambient light is reflected off of the LCD lens 1201 into the eye camera 1203. In another embodiment, an eye camera is mounted to view and track the eye directly, for example, as shown in the configuration of FIG. 11.

Images collected by the eye camera 1203 are fed to the eyepiece processor 1202 via the camera driver module 1302, and then sent via the transceiver 1204 to the main computer 1211 for further processing and scene generation. As the scenes are generated based on the eye tracking information, the scenes are forwarded from the main computer 1211 to the eyepiece processor 1202 via the transceiver 1204. The received scene signals are forwarded to the LCD drive control module 1301 and output on the LCD lens 1201.

During the scene processing, which will be described in detail with respect to FIG. 14, the scenes that are generated create at least two zones of resolution to ease eyestrain and enhance the reality of viewing the scenes. A first zone, a high-resolution zone 1310 of the scenes is generated at the point at which the pupil 1304 is focused, i.e. the focal point.

A second zone, a low-resolution zone 1311 is generated around the high-resolution zone 1310. The resolution levels can be defined by the system or user based on system parameters. The low-resolution zone 1311 is preferably an annular ring of peripheral blurring. This two-level resolution process creates a more realistic viewing experience as well as eases the eyestrain commonly caused by single resolution LCD eyewear. It is also contemplated by the present invention that more than two zones of resolution can be applied to the display. When more than two zones are utilized, less resolution, i.e. more blurring, is applied to the display rings as the distance from the focal point increases. This multiple level zone resolution adds even more to the more realistic viewing experience as well as eases the eyestrain commonly caused by single resolution LCD eyewear.

Figure 14:
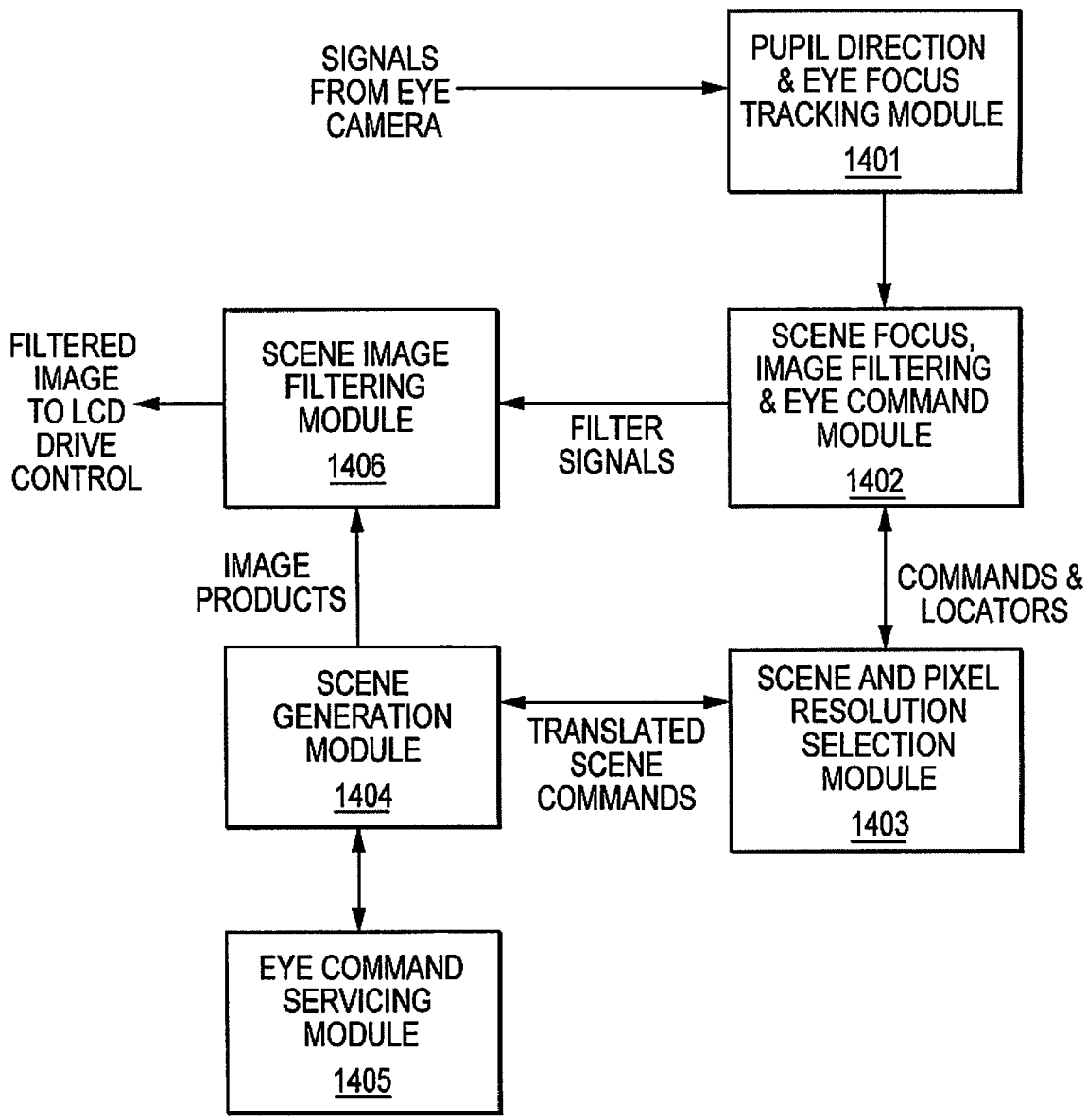
FIG. 14 is a functional flow diagram detailing the operation of the present invention.

FIG. 14 is a functional flow diagram detailing the operation of the present invention. Video signals are received from the eye cameras at the pupil direction and eye focus tracking module 1401. The pupil direction and eye focus tracking module 1401 automatically draws the eye reference points and pupils. This can be accomplished in drawing form using a real-time line-drawing visualization software. The reference points and pupil are registered in a two dimensional coordinate frame.

Real-time visualization of 3D models is a topic of substantial interest and research. Because complex geometry significantly slows down the speed of visualization, typical real-time applications (e.g., video games) use texture maps applied to relatively simple geometry to create complex-looking scenes. However in some applications, such as the visualization of large geometric models, complex geometry is central to the data set. As a result, visualization of models with large amounts of geometry is an active area of current research. Application of quad-tree data structures is utilized in real-time drawing visualization of 3D models. For a detailed analysis, see Michael W. Roth, "Three-Dimensional Visualization for Large Models", SPIE Vol. 4377 Laser Radar Technology and Applications VI (2001), the contents of which is incorporated herein by reference. The data is divided into four pieces such that each piece can be rendered as a primitive. A compact representation of each piece is employed (location, size, tilt, etc.). Each piece is represented as a data node on a tree. Then the pieces are in turn divided similarly. This process is repeated until the smallest primitives are reached. The process of rendering the data then becomes merely traversing the tree. When the traversal reaches the size of a pixel or the last leaves of the tree, the rendering stops. This approach leads to exceptionally fast rendering of the data. Data outside of the viewing frustum are discarded at high speed as the tree is traversed. The non-culled data is rendered in finite time corresponding to the number of pixels (N) in the rendered image. In particular, if Dt is the maximum amount of time spent rendering a non-culled node, it can be shown that the total amount time required to render the data within the viewing frustum is no more than (4/3) N Dt. This approach also accommodates processing hardware that is more modest than that needed to accomplish real-time rendering. In particular, if the hardware can only reach a certain level of the tree before a new rendering must start (for example, due to rapid perspective changes requested by the user), the images appear to be slightly blurred. When, sufficient time is available for the rendering to complete (due, for example, to the cessation of perspective changes), the blurring disappears as the remainder of the tree is traversed until the final tree leaves or the size of a pixel is reached. The conversion of a DEM to quad-tree format can also be accomplished in an efficient manner. As long as the processing system has sufficient RAM so that virtual memory is not required, conversion times can be a few minutes on current PC platforms. Finally, the file sizes are also efficient. The quad-tree-format files can have sizes that are approximately twice the size of a raster-scanned floating-point-elevation-per-sample DEM file.

Returning again to FIG. 14, the pupil and eye tracking module 1401 aligns the eyes on a two dimensional coordinate grid. Both eyes are tracked. Tracking both eyes allows the degree of eye crossing to be measured from the two coordinate grids so that an input to the closeness of the 3D scene being viewed indicates eye focal distance. A supplementary, or alternate approach is to correlate the pupil locations with features of the scene to calculate the focal distance from the scene itself. When sufficient camera resolution is provided, or with the use of stereo cameras, the system can determine eye and lens movement sufficiently to directly measure eye focus. Additionally, changes in the eye shape itself can be utilized to determine where the eye is focusing. This novel process of coordinating 3D imaging based on pupil and elongation tracking adds to the overall reduction in eye-fatigue and processing power required in a 3D imaging system. Whichever methods are used, the eye direction and focus form the basis to condition well focused, eye-saving, 3D aspect imagery on each eyepiece and/or screen for all three embodiments.

Scene focus, image filtering and eye command module 1402 receives the eye coordinates from the pupil and eye tracking module 1401 and performs the following calculations: (1) determining the region where the eye is looking that needs the maximum focused scene resolution and what level of resolution is consistent with the eye's resolving power; (2) determining where in the scene the annular region of reduced resolution and focus should occur to reduce eye strain and provide a more natural peripheral vision; and, (3) discerning if the eye is looking at a portion of a side menu to indicate a command. In order to distinguish between viewing and entering eye commands, eyelid blink pattern may be part of ensuring an actual command rather than an inadvertent glance at a command window (i.e., to reduce 'false alarms'). From these results, scene focus, image filtering and eye command module 1402 sends commands to the scene and pixel resolution module 1403 that accesses the portions of the scene that need to be used, and enables any indicated commands (such as zoom in or out, or lock onto an object for automatic tracking).

The scene generation module 1404 may contain a database of pre-recorded imagery, generated imagery, or a combination of both. It also may be the output of an array of a series of live TV cameras responding to the viewer, either locally or remotely. With access to the eye command servicing module 1405, the scene generation module 1404 accesses the proper parts of the scene in accordance with the input commands from scene and pixel resolution modules 1403. The Roth 3D pruning software described above, is also utilized in scene generation module 1404 to furnish the resolution requested and thereby save computing time and/or capacity.

The scene generation module 1404 sends the digital scene data to scene image filtering module 1406 that performs two services: (1) filtering the defocused peripheral annulus and high resolution focal region to refine the boundaries and nature of the resolution pairing; and, (2) furnishing updates to the graphic command status display to be shown in the eyepiece image.

Finally, the filtered image is forwarded to the LCD drive control 1301 to control the LCD (and/or display screen) to present the digital pixel imagery.

Figure 15:
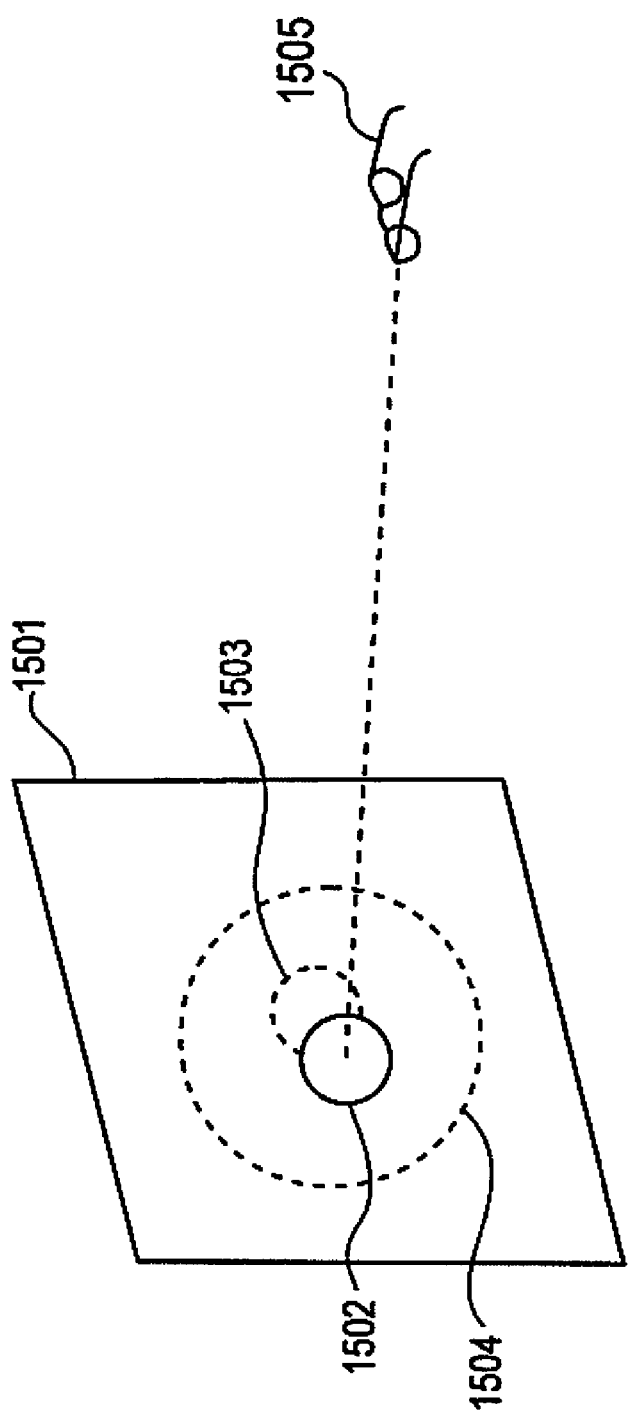
FIG. 15 illustrates a method for aligning images viewed by the right and left eyes.

FIG. 15 illustrates a method for aligning images viewed by the right and left eyes. FIG. 15 describes the embodiment described with respect to FIG. 9, in which one eye (in this example, the left eye) looks at the LCD of eyepiece 1505, and the other eye (in this example, the right eye) looks simultaneously at the screen 1501. The individual eye trackers establish the position 1502 where the left eye is looking on the screen 1501. Based on the tracked behavior of the right eye, the system computes where the left LCD of eyepiece 1505 should view that would provide a 3D rendering of the combined eyes. This is initiated via geometry calculations, but fine-tuning requires draping, where an image is mathematically draped over a digital terrain model and then the resulting scene is rendered from a variety of viewpoints, of the pixels presented to each eye to precisely align and then provide a precision 3D stereo offset. In addition, the scene presented through the LCD of eyepiece 1505 is tailored with the high resolution, focal center 1503 surrounded by the defocused peripheral vision annulus 1504 to prevent eye fatigue, as described above. Note that an analogous left to right eye alignment would be needed for the embodiment described with respect to FIG. 10 where each eye views through a different LCD of an eyepiece. In this case the focal center 1503 and defocused ring 1504 would be needed for both eyes.

As was illustrated herein, the present invention solves the longstanding problems of misalignment, eyestrain, and high costs associated with the conventional 3D systems by providing grid alignment among multiple participants, reducing eyestrain with present 3D glasses, and reduces hardware costs, mostly in computing power.

Regardless of the particular embodiment, a fiber optic camera 1103 is provided for each eye. Each fiber optic camera 1103 has a sufficient field of view so that it views the entire eye viewing area. In this way, for an eyepiece 1101, the camera system 1103 can be mounted from the ear (not shown) and can image the eye's reflection from the partially reflecting eyepiece surface 1102. For the screen, with no eyewear, a camera 1103 is mounted near the screen looking back at the subject and viewing each eye directly to track movement. For the LCD display, eyewear the camera 1103 may be in the visual regime if it can discern the eye reflection against the scene being displayed on the LCD eyepiece display. The LCD display view may be directionally suppressed in the camera direction to increase eye reflection contrast. Otherwise an infrared camera can be utilized. Also, it is best if ambient light is sufficient to illuminate the eye so that adequate reflected light reaches the camera. The illumination can be from the LCD scene itself. Another source of illumination can be light at a wavelength, e.g., infrared that does not interfere with the LCD scene. Each eyepiece 1101 is also supplied with an eyepiece processor 1104 for providing overall control of the eyepiece 1101, and an eyepiece transceiver 1105 for transmitting and receiving signals to and from a main computer (not shown).

What is claimed is:
1. A system for a 3-dimensional display, comprising:
  at least one eyepiece, comprising:
    a frame including first and second eyepiece sockets;
    a first display disposed in said first eyepiece socket associated with a first eye for displaying first image data;
    a clear lens disposed in said second eyepiece socket associated with a second eye;
    two eye cameras mounted to the frame and arranged such that
      a first eye camera receives a reflection of said first eye from said first display and tracks eye reference points of said first eye reflection and a second eye camera receives a reflection of said second eye from said clear lens and tracks eye reference points of said second eye reflection;
a processor for providing overall control of said at least one eyepiece; and
an eyepiece transceiver for transmitting and receiving signals;
a second display, at a location separated from said at least one eyepiece, for displaying second image data at the separated location;
a main processor; and
a main transceiver connected to said main processor for transmitting signals between said main processor and said at least one eyepiece,
wherein said two eye cameras track said reference points of said reflections of said first and second eyes, said eyepiece transceiver transmits said reflected reference points to said main processor via said main transceiver, said main processor calculates a focal point based on said reflected eye reference points and generates said first and second image data based on said focal point, said first and second image data transmitted to and output from said first display in said one eyepiece and said second display at said separated location, and
wherein said first and second image data output from said first and second displays produces a 3-dimensional image.

2. The system for a 3-dimensional display of claim 1, wherein said second display is viewed by said second eye through said second eyepiece socket.

3. The system for a 3-dimensional display of claim 1, wherein said first and second image data is generated by said main processor to produce on said at least one display a fine focus area of fine resolution and a course focus area of course resolution.

4. The system for a 3-dimensional display of claim 3, wherein said fine focus area is located about said calculated focal point, and said course focus area is located about said fine focus area.

5. The system for a 3-dimensional display of claim 1, wherein said reflected eye reference points are utilized in pupil tracking calculations.

6. The system for a 3-dimensional display of claim 1, wherein said reflected eye reference points are utilized in eye elongation tracking calculations.

7. A method for 3-dimensional displaying of image data, comprising the steps of:
tracking eye reference points of a first eye;
tracking eye reference points of a second eye;
calculating a focal point based on the eye reference points;
generating 3-dimensional image data from base data based on said focal point; and
displaying said 3-dimensional image data on at least one display;
wherein the step of generating 3-dimensional image data based on said focal point comprises generating first and second image data for display on a first and a second display, such that when said first and second displays are viewed simultaneously said first and second image data produces a 3-dimensional image, and
wherein said first display is contained in a first eyepiece socket of an eyepiece and said second display is at a location separated from said eyepiece and viewed through a second eyepiece socket of said eyepiece.

8. The method for 3-dimensional displaying of image data of claim 7, wherein said 3-dimensional image data is generated to produce a fine focus area of fine resolution and at least one course focus area of course resolution.

9. The method for 3-dimensional displaying of image data of claim 8, wherein said fine focus area is located about said focal point, and said at least one course focus area is located about said fine focus area.

10. The method for 3-dimensional displaying of image data of claim 7, further comprising the steps of:
(a) dividing said base data into at least two pieces such that each piece can be rendered as a primitive;
(b) generating a representation of said at least two pieces;
(c) representing said at least two pieces as a data node on a tree;
(d) dividing each of said at least two pieces into at least two sub-pieces; and
(e) repeating steps (a) through (d) until smallest primitives are reached.

11. The method for 3-dimensional displaying of image data of claim 10, wherein the 3-dimensional image data is generated by traversing the tree, and wherein when the traversal reaches the size of a pixel the rendering stops.

12. The method for 3-dimensional displaying of image data of claim 11, wherein base data outside of a viewing frustum is discarded at high speed as the tree is traversed.

13. A system for a 3-dimensional display, comprising:
at least one eye camera for tracking eye reference points of a first eye and a second eye;
a processor for calculating a focal point based on said eye reference points and for generating 3-dimensional image data based on said focal point; and
at least one display for displaying said 3-dimensional image data,
wherein said processor generates first and second image data for display on a first and a second display, such that when first and second displays are viewed simultaneously said first and second image data produces a 3-dimensional image,
wherein said first display is contained in a first eyepiece socket of an eyepiece and said second display is viewed through a second eyepiece socket of said eyepiece, and
wherein the second display is at a location separated from said eyepiece.

14. The system for a 3-dimensional display of claim 13 wherein said image data is generated by said processor to produce on said at least one display a fine focus area of fine resolution and a course focus area of course resolution.

15. The system for a 3-dimensional display of claim 13 wherein said at least one course focus area decrease in resolution as a distance from said focal point increases.

16. The system for a 3-dimensional display of claim 14, wherein said fine focus area is located about said focal point, and said course focus area is located about said fine focus area.

17. The system for a 3-dimensional display of claim 13, wherein said processor (a) divides the base data into at least two pieces such that each piece can be rendered as a primitive, (b) generates a representation of said at least two pieces, (c) represents said at least two pieces as a data node on a tree, (d) divides each of said at least two pieces into at least two sub-pieces, and repeats steps (a) through (d) until smallest primitives are reached.

18. The system for 3-dimensional display of claim 17, wherein the 3-dimensional image data is generated by traversing the tree, and wherein when the traversal reaches the size of a pixel the rendering stops.

19. The system for 3-dimensional display of claim 18, wherein base data outside of a viewing frustum is discarded at high speed as the tree is traversed.

20. The method for 3-dimensional displaying of image data of claim 7, wherein the steps of tracking eye reference points of a first eye and tracking eye reference points of a second eye include tracking reflected eye reference points of said first eye and tracking reflected eye reference points of said second eye.

21. The system for a 3-dimensional display of claim 13, wherein said first and second eyepieces generate reflected images of said first and second eyes and corresponding eye reference points, respectively, and said processor calculates said focal point based on said reflected eye reference points.

* * * * *